Feb. 9, 1965　　　L. F. MILLER　　　3,168,764
FOUNDRY MOLDING MACHINE AND METHOD OF MOLDING
Filed July 9, 1958　　　　　　　　　　　　5 Sheets-Sheet 1
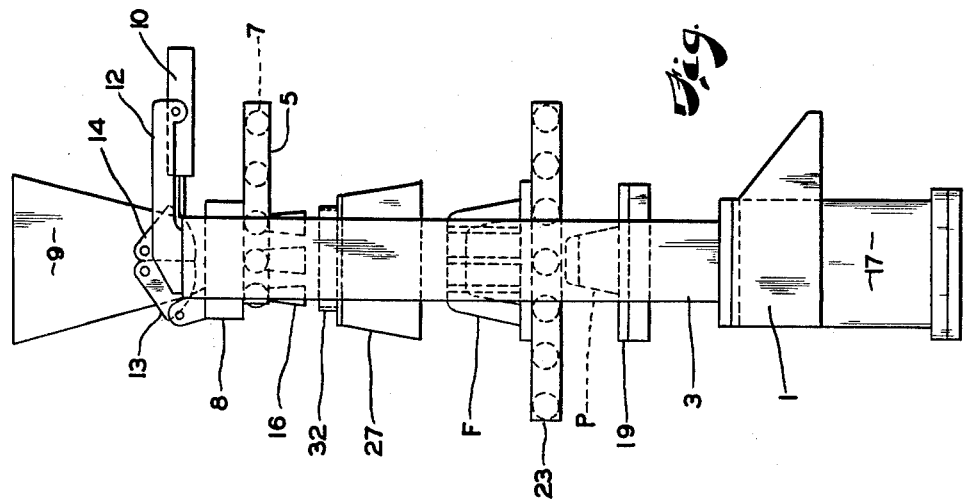
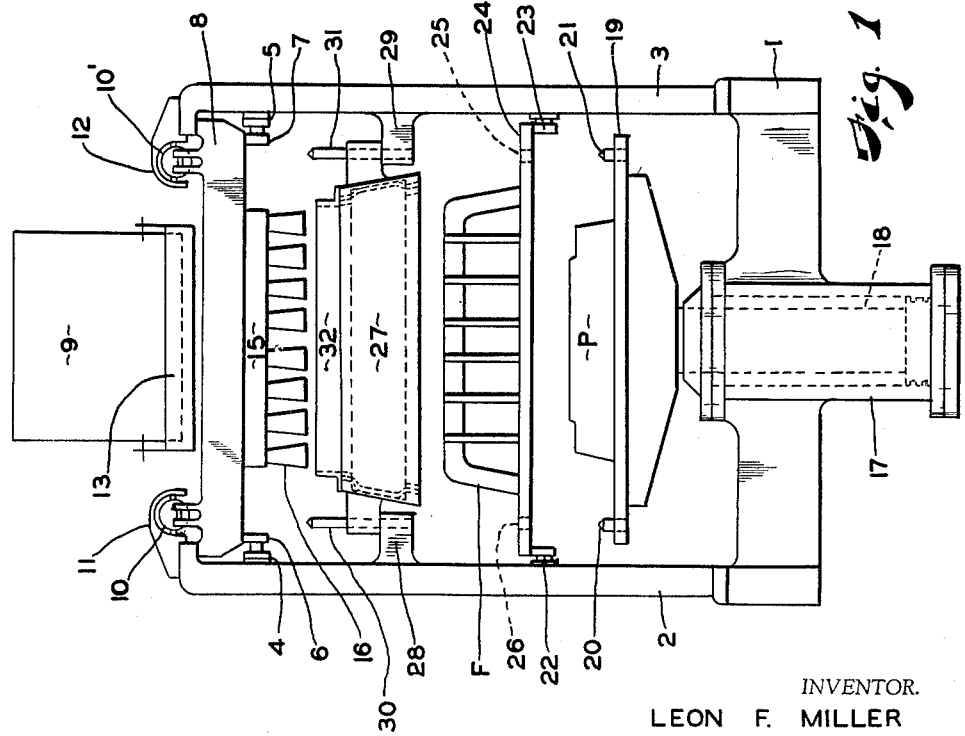
INVENTOR.
LEON F. MILLER
BY
Oberlin & Limbach
ATTORNEYS Feb. 9, 1965 L. F. MILLER 3,168,764
FOUNDRY MOLDING MACHINE AND METHOD OF MOLDING
Filed July 9, 1958 5 Sheets-Sheet 2

INVENTOR.
LEON F. MILLER
BY Oberlin & Limbach
ATTORNEYS

Feb. 9, 1965 L. F. MILLER 3,168,764
FOUNDRY MOLDING MACHINE AND METHOD OF MOLDING
Filed July 9, 1958 5 Sheets-Sheet 3

INVENTOR.
LEON F. MILLER
BY
Oberlin & Limbach
ATTORNEYS

Feb. 9, 1965    L. F. MILLER    3,168,764
FOUNDRY MOLDING MACHINE AND METHOD OF MOLDING
Filed July 9, 1958    5 Sheets-Sheet 4

INVENTOR.
LEON F. MILLER
BY
Oberlin & Limbach
ATTORNEYS

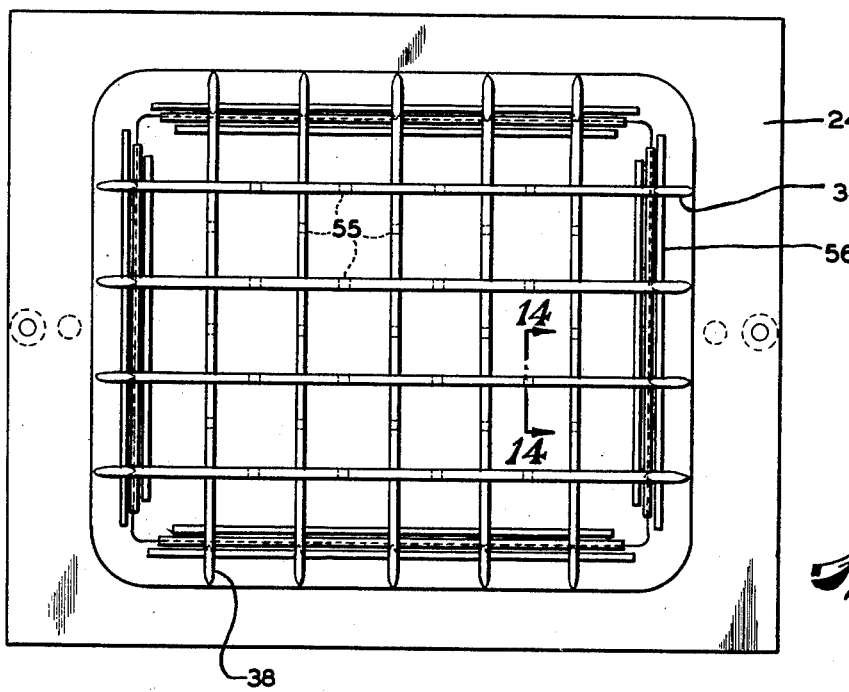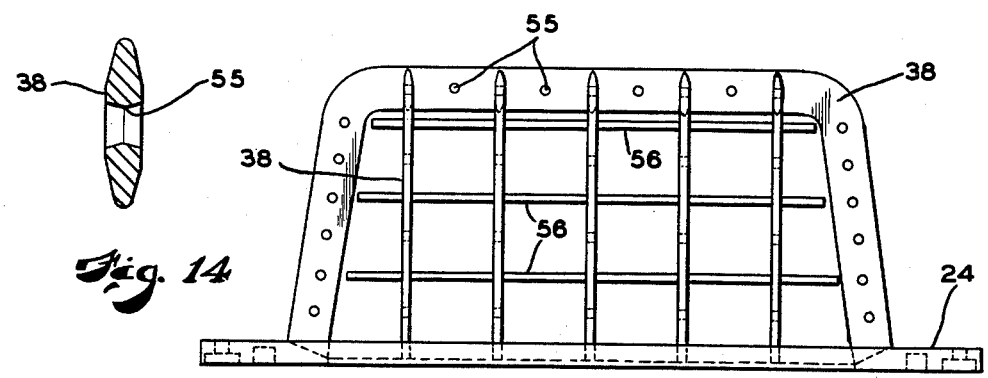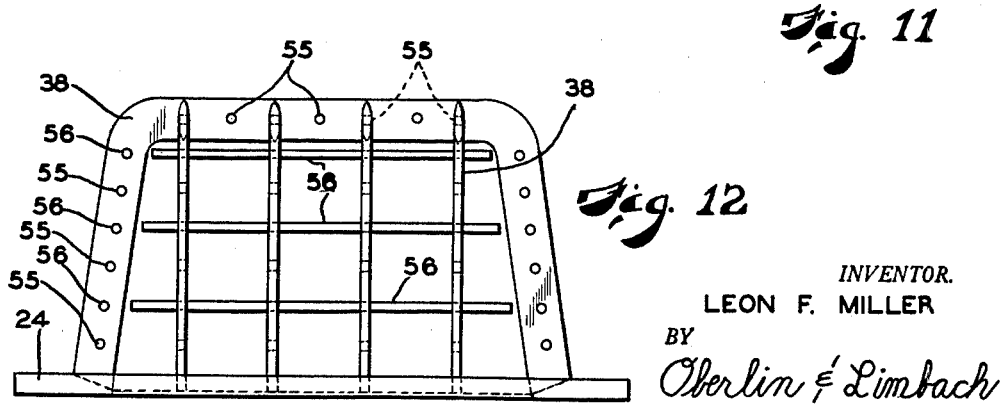

United States Patent Office 3,168,764
Patented Feb. 9, 1965

3,168,764
FOUNDRY MOLDING MACHINE AND METHOD OF MOLDING
Leon F. Miller, Rocky River, Ohio, assignor to The Osborn Manufacturing Company, Cleveland, Ohio, a corporation of Ohio
Filed July 9, 1958, Ser. No. 747,474
43 Claims. (Cl. 22—36)

This invention relates as indicated to a foundry molding machine and method of molding, and more particularly to a machine and method utilizing a squeezing operation to squeeze the sand or other molding material against an appropriate pattern.

A well-known method of producing foundry molds is the so-called jolt-squeeze method, the sand being compacted against the pattern by means of a violent jolting operation followed by imposition of heavy squeezing pressure. Jolting has proved advantageous in effectively compacting the sand against the different surfaces of the pattern but has been found very objectionable in other respects. It is an extremely noisy, indeed deafening, operation and requires the provision of a massive foundation for the machine and relatively heavy construction of the machine itself. It is accordingly an important object of the present invention to provide a molding apparatus and method whereby high quality foundry molds may be produced without the necessity of employing a jolting operation.

While a simple squeeze operation may be adequate in certain cases where simple shallow patterns are employed, it has not been found adequate properly uniformly to compact the sand against the various facets of a relatively deep and complex pattern, the squeezing pressure being imposed in one direction only. It is therefore another important object of my invention to provide an apparatus and method of molding involving the application of squeezing pressure in a plurality of directions.

Still another object is to provide a novel foundry flask suitable for handling in the usual manner and yet adapted for use in such multiple squeeze operation.

A further object is to provide such flask of a form which will facilitate shake-out following the casting operation and which may be formed to correspond generally to the shape of the pattern employed so as to reduce the quantity of molding sand required and permit improved ramming of the sand against the pattern.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a semi-diagrammatic front elevational view of one form of apparatus embodying the principles of my invention;

FIG. 2 is a side elevation of the apparatus of FIG. 1;

FIGS. 11, 12 and 13 are a side elevation, an end elevation, and a top plan view respectively of a novel flask embodying the principles of my invention; and FIG. 14 is a transverse section taken on the line 14—14 on FIG. 13 through one of the flask bars to show the configuration of the same.

General construction

Figure 6:
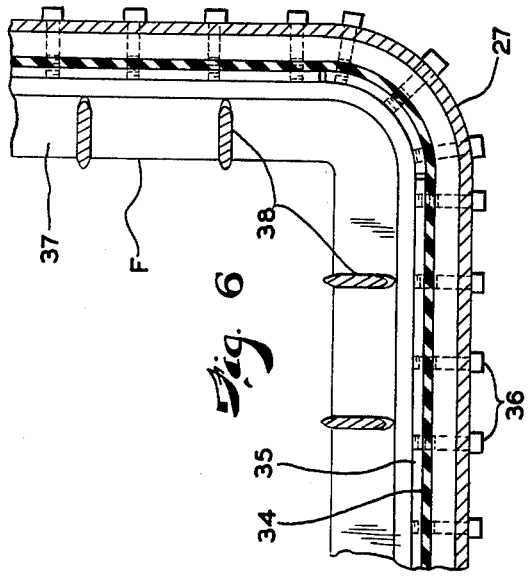
FIG. 6 is an enlarged fragmentary horizontal cross-section taken on the line 6—6 on FIG. 3 showing the arrangement of the squeeze diaphragm and flask.

Referring now to FIGS. 1 and 2 of the drawing, the embodiment of my invention there illustrated comprises a base frame 1 carrying two vertically extending side frame members 2 and 3, these latter supporting horizontal rails 4 and 5 with rollers 6 and 7 on which head frame 8 is adapted to be reciprocated into and out of position beneath sand bin 9 through operation of actuating cylinders 10 and 10' carried by outrigger brackets 11 and 12. Through a linkage arrangement (not shown) the clamshell gates 13 and 14 may be caused to open when head frame 8 is reciprocated from beneath the same and closed when such head frame is returned to the position shown in the drawing. The upper end portions of side frames 2 and 3 are turned in to prevent lifting of head frame 8 when in such position. A squeeze board 15 is mounted on the under side of head 8 and carries a number of downwardly projecting squeeze biscuits 16 adapted to enter a flask to compact the sand therewithin.

Base frame 1 is adapted to rest upon the foundry floor and includes a large centrally located squeeze cylinder 17 projecting downwardly below floor level and containing a squeeze piston 18 adapted to be elevated by means of fluid pressure in well-known manner. Such piston carries a squeeze table 19 having upwardly projecting register pins 20 and 21 and adapted to support the pattern P thereon. A flask F is supported above table 19 on horizontal roller conveyors 22 and 23 and its horizontal peripheral flange 24 is provided with apertures 25 and 26 adapted to register with tapered pins 20 and 21 when table 19 is elevated through actuation of piston-cylinder assembly 18, 17. Flask F is of special construction as explained more in detail below.

A downwardly outwardly tapered girdle frame 27 is supported above flask F on brackets 28 and 29 projecting inwardly from side frame members 2 and 3 respectively and is mounted for vertical reciprocation on guide pins 30 and 31. An upset frame portion 32 of slightly smaller dimensions extends upwardly from the top of girdle 27.

General operation

The remaining elements of the machine structure may best be described in conjunction with an explanation of the general operation of the machine.

An appropriate pattern P is mounted on squeeze table 19 and a special grid type flask F is rolled into position on roller conveyor 22, 23. Fluid pressure piston-cylinder assembly 18, 17 is energized to elevate squeeze table 19 to pick up flask F and to carry the latter upwardly until peripheral flange 24 engages the lower edge of girdle 27.

Figure 4:
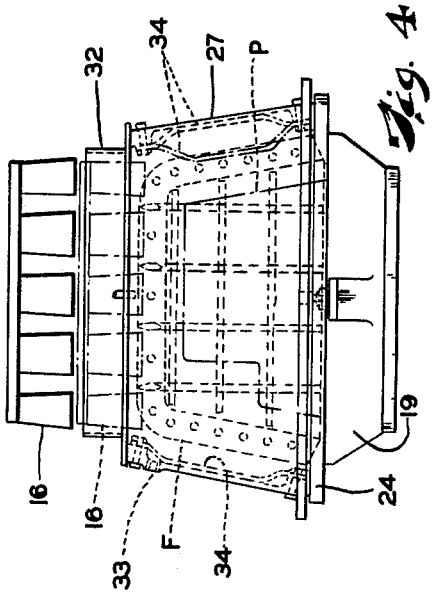
FIG. 4 is an end view of the flask-enclosing girdle frame illustrating the manner of performing such squeeze operation.
Figure 5:
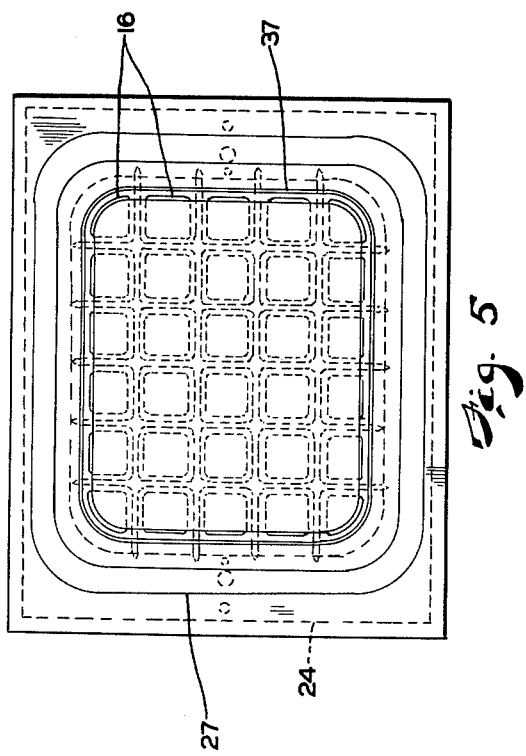
FIG. 5 is a top plan view of the FIGS. 3 and 4 assembly, including the superimposed squeeze board.
Figure 3:
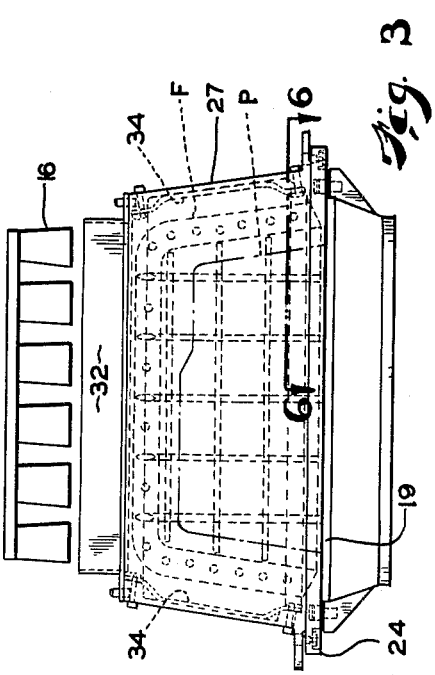
FIG. 3 is a front view of the flask-enclosing girdle frame ready for performance of the squeeze operation.

Head frame 8 is reciprocated out of position beneath sand bin 9 and sand is now discharged from such bin into girdle 27 filling upset frame portion 32 to the proper level. The squeeze head is now reciprocated into position above the upset frame so that the various parts are arranged as shown in FIGS. 3, 4 and 5. Then, as indicated in dotted line in FIG. 4, piston-cylinder assembly 18, 17 will be actuated further to elevate table 19 to cause squeeze biscuits 16 to enter upset frame 32 and project downwardly between the grid bars of flask F, compacting the sand against pattern P and more particularly against the upwardly disposed surfaces of such pattern. Simultaneously with the performance of such mechanical squeezing operation or lagging slightly thereafter, fluid pressure (ordinarily pneumatic but hydraulic fluid may be utilized if desired) is admitted through inlet 33 in girdle 27 to force flexible diaphragm 34 from its outward position as indicated in FIGS. 3 and 4 to the inner position indicated at the right-hand side of FIG. 4. Such diaphragm may be of rubber or other resiliently distensible material or it may be of rubber or Neoprene impregnated fabric which is flexible but not truly distensible. As indicated in FIGS. 3 and 4 but more clearly shown in enlarged section in FIG. 6, the upper and lower edges of the diaphragm 34 may be clamped in sealing engagement with the upper and lower portions of girdle 27 by means of clamp bars such as 35 and screws 36, the diaphragm extending completely around the inner periphery of girdle 27 and in effect forming a liner therefor.

The flask F is formed in this case of a rectangular base member 37 secured to the horizontal peripheral flange 24 and having welded thereto the arched grid members 38 so that the flask to some extent resembles an inverted openwork basket. Such members 38 form a grid through the spaces of which the squeeze biscuits 16 are adapted to extend, and such members 38 are of relatively narrow cross-section with their longer sections extending toward the diaphragm and girdle. Consequently, when such diaphragm is forced inwardly, relatively little resistance is afforded by members 38 to the lateral compacting of the sand against pattern P through such action of the diaphragm. Furthermore, there is very little strain on the flask during performance of the two types of squeezing operations.

Upon completion of such squeezing operations, the fluid pressure is relieved behind diaphragm 34 and the fluid preferably positively withdrawn so as to move such diaphragm into fully retracted position. Piston-cylinder assembly 18, 17 is then actuated to lower squeeze table 19, thereby first depositing girdle 27 on the supporting brackets 28 and 29 and then withdrawing flask F from such girdle and depositing it on its roller conveyor 22, 23. Continued downward movement of the squeeze table then serves to draw the pattern from the mold within the flask, and the flask and mold may be removed from the machine on conveyor 22, 23. The cycle is then ready to be repeated.

*Modifications utilizing blow filling*

Figure 7:
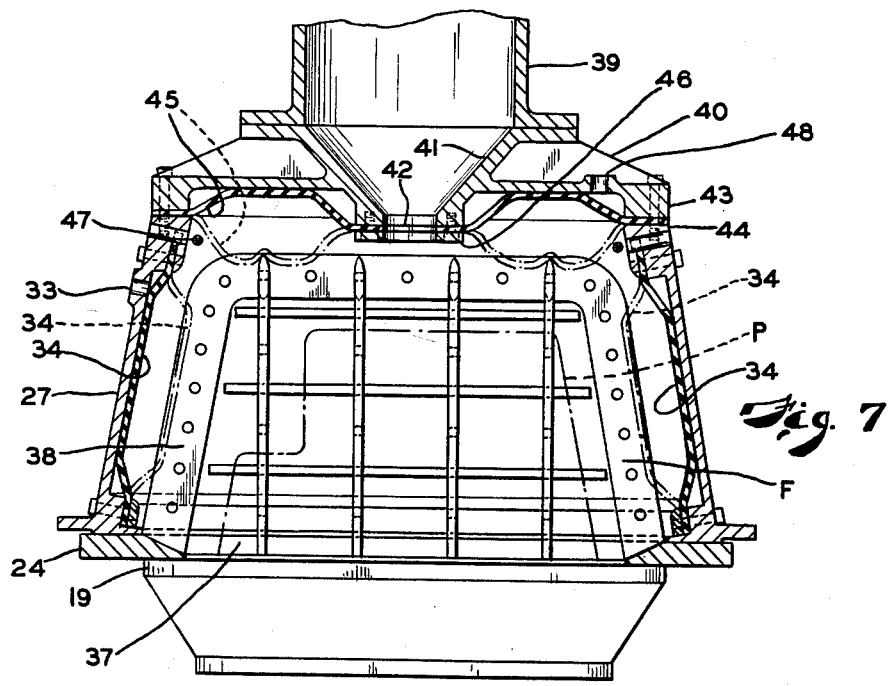
FIG. 7 is a vertical cross-section through the flask-enclosing girdle including adapter means for employment of a blowing machine to fill the flask and modified inflatable squeeze means.

Now referring to FIG. 7 of the drawing, a somewhat modified construction is there illustrated wherein the flask and girdle are adapted to be filled through employment of a blowing operation comparable to that utilized in conventional core blowing machines.

Reference may be had to Ellms Patent No. 2,545,944 wherein is disclosed a core blowing machine suitable for employment for my purpose. Other forms of commercially available core blowing machines well known in the art may likewise be employed.

In the embodiment illustrated in FIG. 7, the lower end of the core blower sand reservoir 39 is provided with an adapter 40 including a central downwardly tapering portion 41 forming the lower end of the reservoir and terminating in blow hole 42. A downwardly projecting peripheral flange 43 is provided with a clamping ring 44 to secure the outer peripheral edge of a flexible annular diaphragm 45. The inner peripheral edge of such diaphragm is secured about blow hole 42 by clamping ring 46. The upper edge of girdle 27 is adapted to mate in sealing engagement with such clamping ring 44, and ring 44 also has a number of screened vent openings 47 in the manner of core boxes for escape of air therethrough during performance of the blowing operation. The flask encircling diaphragm 34 is shown in solid line in deflated position and in dotted line in inflated position. Upper annular diaphragm 45 is likewise shown in solid line in deflated or retracted position and in dotted line in inflated or expanded position, fluid being admitted under pressure through inlet 48 in adapter 40 thus to expand such latter diaphragm.

As described above, the squeeze table 19 is elevated through action of piston-cylinder assembly 18, 17 to pick up the flask F and then the girdle 27 which is elevated and held in tight fitting engagement with blow machine adapter 40. The flask and girdle are then filled with sand blown through orifice 42 in conventional manner with the diaphragms in retracted position. Upon conclusion of the blow, such diaphragms 34 and 45 are inflated further to compact the sand against the lateral and upper surfaces of the pattern. Such diaphragms are now preferably retracted to solid line position and table 19 lowered first to disengage the girdle 27 from the blowing machine adapter, then to withdraw the flask and mold from the girdle, and finally to draw the pattern P from the finished mold.

Figure 8:
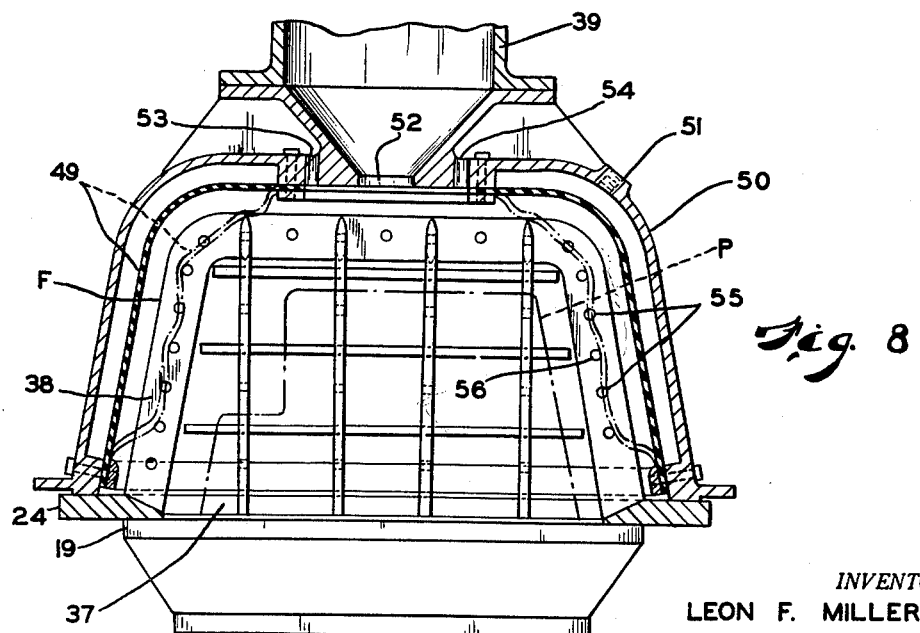
FIG. 8 is a similar vertical cross-section showing a further modified flask-enclosing girdle and inflatable diaphragm squeeze means.

In the embodiment shown in FIG. 8 of the drawing, the apparatus is generally similar to that of FIG. 7 except that the adapter and girdle comprise a single unit attached to the reservoir 39 of the blowing machine and but a single diaphragm 49 need be utilized. Such combined adapter and girdle comprises a downwardly opening box 50 having a fluid pressure inlet 51 and a central blow inlet 52. The diaphragm 49 extends around the inner periphery of the box, being clamped in sealing engagement therewith adjacent its lower edge and secured at its upper edge somewhat radially outwardly spaced from blow inlet 52, affording room for screened vent openings such as 53 and 54 surrounding such blow opening. Consequently, diaphragm 49 not only laterally encompasses flask F but also overlies the upper portion of the flask to a considerable extent.

As previously explained, squeeze table 19 is elevated first to pick up flask F and then to carry such flask into box 50 where its lower flange 24 is clamped in sealing engagement as shown. The blowing machine is operated to blow sand through opening 52 to fill the flask and box with the diaphragm 49 being in solid line position. Such blowing operation is effective to compact the sand quite satisfactorily against the upper portions of the pattern more or less beneath the blow opening, but further compacting of the sand is desired against other portions of the pattern. This is effected by admitting fluid pressure through inlet 51 to force diaphragm 49 inwardly substantially into dotted line position indicated. The arched frame members 38 of flask F may be provided with aligned orifices such as 55 into certain of which rods such as 56 may be inserted, assisting in supporting the finished mold. Upon conclusion of this squeezing operation, the diaphragm may preferably be retracted to solid line position and table 19 lowered to remove the flask and mold from box 50 and then to draw pattern P.

Figure 9:
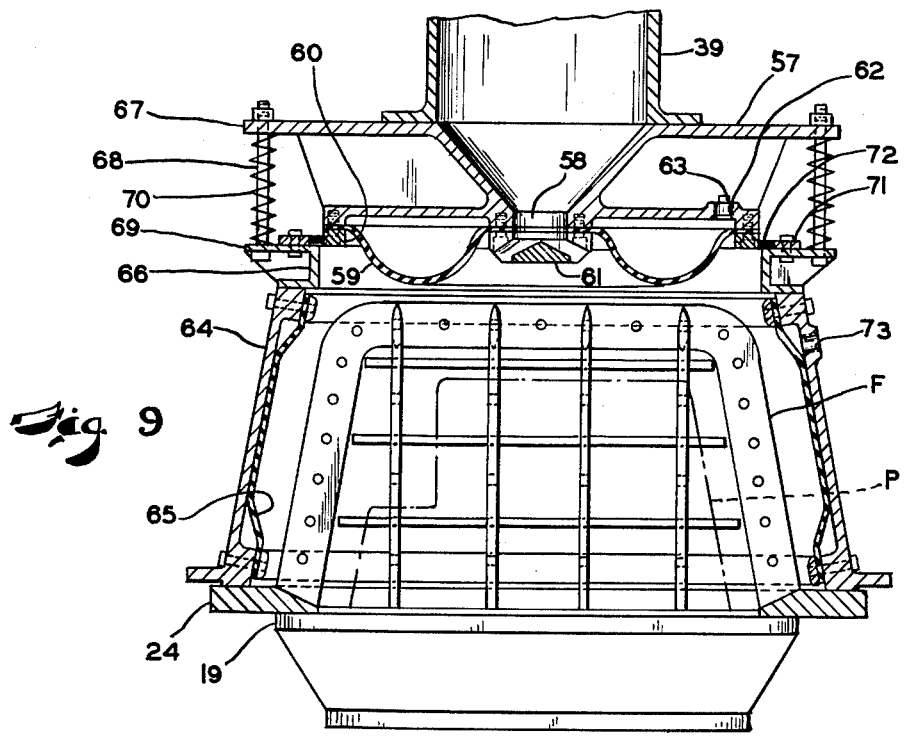
FIG. 9 is a vertical section through still another modified flask-enclosing girdle and blow machine assembly including provision for supplemental elevation of the flask and girdle following performance of the blowing operation.
Figure 10:
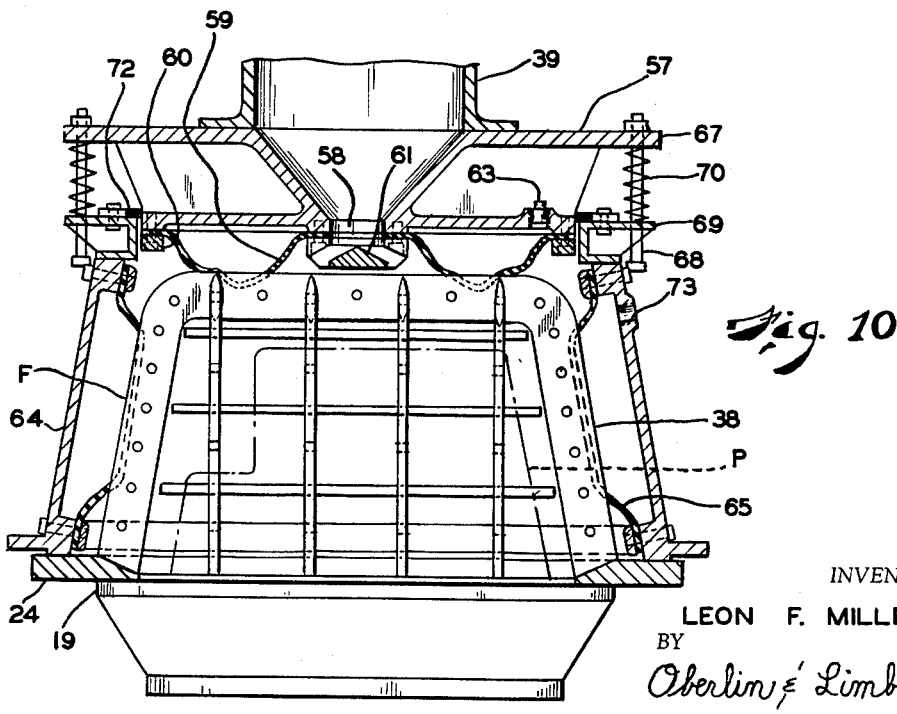
FIG. 10 is a vertical section corresponding to FIG. 9 but showing the flask thus elevated and the lateral squeeze diaphragms inflated.

In FIGS. 9 and 10 there is illustrated a related modification likewise providing for blowing of the sand into the flask and girdle but combining certain aspects of the previously described embodiments to achieve superior results.

The lower end of reservoir 39 in this case has an especial adapter 57 secured thereto terminating in central blow opening 58. An annular diaphragm 59 somewhat similar to diaphragm 45 (FIG. 7) is secured to the underside of the adapter by outer clamping ring 60 and inner ring and spreader 61 which also serves to distribute the sand discharged from blow opening 58. No vents are provided of the usual type, special means being employed for this purpose. A filler opening 62 permits the space above diaphragm 59 to be filled with fluid, preferably hydraulic fluid, and such opening is then closed with plug 63 so that while the conformation of the diaphragm 59 may be altered by flexing, the total space occupied by the cavity behind the diaphragm is substantially unalterable. Accordingly, if such diaphragm is caused to protrude in one portion, it must be correspondingly retracted in another portion, and vice versa.

The girdle proper 64 is quite similar to girdle 27 (FIG. 3) and is similarly provided with a generally cylindrical diaphragm 65 secured therewithin at its upper and lower edges and adapted to surround the flask F and pattern P when these have been elevated into position within the girdle as shown in FIG. 9.

A ring 66 is mounted on the upper end of girdle 64 and forms an upper extension of the same dimensioned to clear the lower margin of adapter 57 with only slight space therebetween. Ring 66 and girdle 64 are suspended from upper flange 67 of the adapter by means of bolts such as 68 passing through outwardly projecting flange 69 on ring 66. Compression springs such as 70 are interposed between flanges 67 and 69 tending (in conjunction with gravity) to hold girdle 64 in its lowermost position as shown in FIG. 9. This is the blow position.

An annular brush element 71 having brush material 72 projecting inwardly is mounted on flange 69 of ring 66 with the brush face (i.e. the inner ends of the brush material 72) engaging the outer surface of clamping ring 60 and adapter 57. Air is enabled to filter outwardly through such brush material during performance of the blowing operation, thereby affording superior venting means. Furthermore, girdle 64 and ring 66 may be reciprocated vertically relative to adapter 57 without disturbing such venting means.

The operation of this embodiment of the invention may now be understood in conjunction with a consideration of FIG. 10. As above indicated, squeeze table 19 is elevated first to pick up flask F and then to carry the latter into girdle 64, making sealing engagement with the lower lip of the latter as shown in FIG. 9. The blowing operation is then performed to fill girdle 64 and ring 66, which thus serves as an upset frame similar to frame 32, diaphragm 65 being in retracted position as shown in FIG. 9. Squeeze table 19 is next further elevated as illustrated in FIG. 10 with consequent compression of springs 70 and reciprocation of brush 72 along the outer surface of clamping ring 60 and adapter 57. Inasmuch as the fluid behind diaphragm 59 is substantially incompressible and cannot escape from the cavity, the sand is firmly squeezed thereagainst and also against the central portion of the sand distributing nozzle 61. Diaphragm 59, being flexible, is capable of altering its contour to accommodate portions of the flask grid bars 38. Simultaneously with or immediately following such squeezing operation, fluid under pressure is admitted through inlet 73 in girdle 64 to inflate diaphragm 65, thereby also compacting the sand peripheries of pattern P. It will thus be seen that I provide for mechanically squeezing the sand within the girdle by further elevation of the flask, pattern and girdle to press the sand against a deformable but incompressible squeeze head, while actively exerting a squeezing pressure laterally of the pattern by means of expansible diaphragm 65. The advantages of the upper diaphragm squeeze are obtained with the simplicity and power of the already available piston-cylinder assembly 16, 17. The diaphragm 65 is then retracted to FIG. 9 position, and table 19 lowered to drop the girdle to FIG. 9 position and then to carry the flask and mold downwardly out of the girdle followed by drawing of the pattern from the flask.

The flask

It will be apparent from the foregoing description that my new flask is an important element of the cooperative assembly making feasible the new method of molding. Obviously, the usual foundry flasks, even those provided with large vent openings, would be unsuitable for my purpose inasmuch as they would not permit adequate lateral squeezing of the sand against the pattern and would themselves be damaged and deformed by any such squeezing operation. The details of construction of a preferred embodiment of my new flask are shown in FIGS. 11–14 inclusive of the drawing. The main frame of the flask may comprise a horizontal plate or flange having a large central opening bridged by arched frame members 38 welded thereto. Such frame members extend at right angles to one another normal to the respective side edges of flange 24, thereby forming a horizontal grid on that side which is normally uppermost during performance of the molding operation. The bars 38 may be of generally elongated cross-section with their inner and outer edge portions bevelled as shown in FIG. 14, such bevelling facilitating intrusion of sand into the interior of the flask during the filling and squeezing operations and also assisting in holding the sand of the completed mold. Similarly, the double bevelled apertures 55 which are provided at intervals through bars 38, when filled with sand during the molding process, assist in locking the completed mold within the flask. Horizontal rods 56 may be inserted through certain sets of aligned apertures 55, particularly in the upstanding leg portions of bars 38 to form side grids therewith better to support the finished mold. The precise number and location of such supplemental rods 56 will depend on the particular pattern and composition of molding material being employed. While the flask is thus of general skeleton grid construction, it nevertheless rigidly reinforces and protects the completed mold and may be handled in generally the same manner as conventional flasks. Cost of fabrication of these flasks is reasonable, and only the lower flange 24 is required to mate with opposed supporting and/or clamping surfaces. The grid construction much facilitates shake-out after pouring and solidification of the castings.

My new skeleton flask need not always have the grid top shown, particularly in the smaller sizes, but it will ordinarily be desirable to provide at least several cross-bars in this region. The openings in the sides of the flask must be large and closely spaced to afford a minimum of resistance to the circumferential, laterally inward squeezing action of the encircling diaphragm. Thus, such openings will ordinarily be at least 4 or 5 inches wide in their narrowest dimension. The flask need not be of general rectangular form as shown but may be of irregular shape to conform generally to the contours of a particular pattern, thereby saving weight and reducing the amount of molding sand which need be employed. In some few cases, the lateral squeeze applied by the encircling diaphragm may be sufficient to form a satisfactory mold without further squeezing of the sand against the top of the pattern. This is particularly true when the sand has been deposited against the pattern by a blowing operation, such operation tending to compact the sand particularly firmly against the upper surfaces of the pattern generally opposed to the blow hole. In some cases, it may be feasible to dispense with the flask entirely and, after withdrawing the mold from the girdle frame, placing such mold in a pouring flask prior to pouring the metal therein. The girdle frame is desirably of downwardly outwardly flaring conformation as shown to facilitate withdrawing the mold therefrom.

While an important advantage of my invention is that under most circumstances there is no need to jolt in order to compact the sand properly uniformly against the pattern surfaces, nevertheless it will be obvious that a supplemental jolting operation may be utilized if desired, prior to performing the squeeze operation (prior to shifting the flask and girdle upwardly against the squeeze head in the FIG. 1 and FIG. 9 embodiments). Of course, the squeezing operation may be directly against the squeeze head adapter in the FIG. 9 embodiment without utilizing the upper diaphragm 59, although the latter is much preferred. Likewise, such upper diaphragm 59 may be inflated and deflated similarly to diaphragm 45 in FIG. 7 instead of or in addition to the application of squeezing pressure through further elevation of table 19. It will likewise be obvious that instead of employing a single continuous diaphragm encircling the flask within the girdle frame several individual diaphragms may be utilized located where most needed with respect to the particular pattern. The diaphragm arrangement shown in FIG. 8 is, however, ordinarily superior and preferred.

Other modes of applying the principle of the invention may be employed, change being made as regards the details described, provided the features stated in any of the following claims or the equivalent of such be employed.

I therefore particularly point out and distinctly claim as my invention:

1. In a foundry molding machine having a vertically reciprocable squeeze table adapted to support a flask and pattern thereon, and a squeeze head adapted to engage and squeeze sand within such flask when said table is elevated; a skeleton flask on said table having large closely spaced openings in its sides, a girdle frame adapted temporarily to enclose said flask on said table for filling with molding sand, and lateral squeeze means within said girdle frame operative to squeeze sand against side faces of such pattern within said flask.

2. The machine of claim 1, wherein said lateral squeeze means is a flexible diaphragm adapted to be forced inwardly by fluid pressure introduced therebehind.

3. The machine of claim 1, wherein said lateral squeeze means is a flexible diaphragm adapted to be forced inwardly by fluid pressure introduced therebehind, said diaphragm completely encircling said flask within said girdle means.

4. The machine of claim 1, wherein said flask comprises a grid of closely spaced wide openings at its upper side, and said squeeze head is provided with a plurality of downwardly extending squeeze biscuits adapted to project through such latter openings.

5. The machine of claim 1, wherein said squeeze head is provided at its underside with a fluid backed downwardly bulging flexible diaphragm adapted to engage and compact sand in said flask when said table is fully elevated.

6. The machine of claim 1, including an upwardly extending upset frame portion on said girdle frame adapted to receive additional sand prior to performance of the squeezing operations.

7. In a molding machine comprising a flask and pattern supporting table, a mold blowing machine having a downwardly opening box with a centrally disposed blow hole in the top of said box, and power means operative to raise and lower said table to carry such flask and pattern into said box and to withdraw them and the mold from said box; a skeleton flask on said table having large closely spaced openings in its sides, lateral squeeze means within said box operative to squeeze sand against side faces of such pattern within said flask, and a flexible diaphragm in the upper part of said box adapted to be forcibly bulged downwardly by introduction of fluid pressure therebehind to compact sand against upper surfaces of such pattern.

8. The machine of claim 7, wherein said diaphragm is annular and surrounds such blow hole.

9. The machine of claim 7, wherein said lateral squeeze means is a flexible diaphragm adapted to be forced inwardly by fluid pressure introduced therebehind.

10. The machine of claim 7, wherein said lateral squeeze means is a flexible diaphragm adapted to be forced inwardly by fluid pressure introduced therebehind, said latter diaphragm completely encircling said flask within said box.

11. In a molding machine comprising a flask and pattern supporting table, a mold blowing machine having a downwardly opening box with a centrally disposed blow hole in the top of said box, and power means operative to raise and lower said table to carry such flask and pattern into said box and to withdraw them and the mold from said box; a skeleton flask on said table having large closely spaced openings in its sides, and squeeze means within said box comprising a flexible diaphragm encircling said flask and overlying the upper portion thereof circumferentially of such blow hole adapted to squeeze sand against both upper and lateral surfaces of such pattern upon introduction of fluid pressure therebehind.

12. A molding machine comprising a flask and pattern supporting squeeze table, a mold blowing machine having a blow hole generally centrally above said table, a squeeze head surrounding such blow hole, a skeleton flask on said table having large closely spaced openings in its sides, a girdle frame adapted temporarily to enclose said flask on said table for filling with molding sand, lateral squeeze means within said girdle frame operative to squeeze sand against side faces of such pattern within said flask, and power means operative to lift said table to squeeze sand within said girdle frame against said squeeze head to compact such sand against the upper surface of such pattern.

13. The machine of claim 12, wherein said lateral squeeze means is a flexible diaphragm adapted to be forced inwardly by fluid pressure introduced therebehind.

14. The machine of claim 12, wherein said squeeze head is provided at its underside with a fluid backed downwardly bulging flexible diaphragm adapted to engage and compact sand in said flask when said table is fully elevated.

15. The machine of claim 12, wherein said lateral squeeze means is a flexible diaphragm adapted to be forced inwardly by fluid pressure introduced therebehind, said diaphragm completely encircling said flask within said girdle means, and said squeeze head is provided at its underside with an annular downwardly bulging flexible diaphragm backed by substantially incompressible fluid sealed therebehind, said latter diaphragm encircling such blow hole, said girdle frame being of wider dimensions than said squeeze head for relative vertical reciprocation when squeezing such sand against said downwardly bulging diaphragm.

16. The machine of claim 12, wherein such blow hole is directed laterally to expose a substantially central area of said squeeze head for squeezing action on sand in said girdle frame.

17. The machine of claim 12, wherein said girdle frame is of wider dimensions than said squeeze head for relative vertical reciprocation when squeezing such sand against said squeeze head.

18. The machine of claim 12, wherein said girdle frame is of wider dimensions than said squeeze head for relative vertical reciprocation when squeezing such sand against said squeeze head, and venting means for the blowing operation are provided between the outer lateral surface of said squeeze head and the inner surface of said girdle frame.

19. The machine of claim 12, wherein said girdle frame is of wider dimensions than said squeeze head for relative vertical reciprocation when squeezing such sand against said squeeze head, and venting means for the blowing operation are provided between the outer lateral surface of said squeeze head and the inner surface of said girdle frame, said venting means comprising brush bristle material closing the space between said squeeze head and girdle frame but adapted to allow the passage of high pressure air therethrough while preventing passage of sand particles.

20. A molding machine comprising a flask and pattern supporting squeeze table, a mold blowing machine having a blow hole generally centrally above said table, a squeeze head surrounding such blow hole provided at its underside with an annular downwardly bulging flexible diaphragm backed by substantially incompressible fluid sealed therebehind, said diaphragm encircling such hole, a skeleton flask on said table having large closely spaced openings in its sides, a downwardly flaring girdle frame adapted temporarily to enclose said flask on said table for filling with sand, lateral squeeze means mounted within said girdle frame comprising a flexible diaphragm encircling said flask and adapted to be forced inwardly by fluid pressure introduced therebehind, said girdle frame being of wider dimensions than said squeeze head for relative vertical reciprocation when squeezing such sand against said downwardly bulging diaphragm, brush bristle material closing the space between said squeeze head and girdle frame adapted to vent high pressure air therethrough while preventing passage of said particles, support means suspending said girdle frame from said blowing machine for vertical reciprocation relative to said squeeze head, and power means operative to lift said table and girdle frame to squeeze sand within said girdle frame against said downwardly bulging diaphragm to compact such sand against the upper surface of such pattern and to lower said table to withdraw the pattern and mold from said girdle frame.

21. The machine of claim 20, including means adapted to stop downward movement of said flask to cause drawing of the pattern from the mold upon further lowering of said table, a grid forming the upper side of said flask, an upset frame portion on said girdle frame adapted to receive additional sand from the blowing operation prior to performance of the squeezing operations, and spring means urging said girdle frame downwardly to lowermost suspended position, said blow hole being divided and turned laterally to expose a substantial area of said squeeze head centrally of said annular downwardly bulging diaphragm for squeezing action on such sand within said girdle frame.

22. The method of forming a mold which comprises blowing molding sand into a box containing a pattern, then squeezing such sand circumferentially inwardly against the sides of such pattern, withdrawing the resultant mold and pattern from such box, and drawing such pattern from such mold.

23. In the method of claim 22, also squeezing such sand against the top of such pattern.

24. The method of forming a mold which comprises depositing molding sand against a pattern in a box, then squeezing such sand laterally inwardly against such pattern, lifting such pattern and box to squeeze the upper portion of such sand against a squeeze head to compact such sand against the top of such pattern, withdrawing the resultant mold and pattern from such box, and drawing such pattern from such mold.

25. The method of forming a mold which comprises placing a pattern within a skeleton flask, placing such pattern and flask within an encircling enclosure, filling such enclosure and flask with molding sand, applying squeezing pressure on such sand from outside the confines of such flask to compact such sand against such pattern and form a mold body interengaged with such skeleton flask, withdrawing such flask, mold and pattern from such enclosure, and drawing such pattern from such mold.

26. In the method of claim 25, applying squeezing pressure on such sand laterally of such pattern from outside the confines of such flask.

27. In the method of claim 25, applying squeezing pressure on such sand laterally of such pattern from outside the confines of such flask and also generally vertically downwardly theretoward.

28. The method of forming a mold which comprises placing a pattern within a skeleton flask, squeezing sand against such pattern by pressure applied from laterally outside the confines of such flask acting through openings in the sides of such flask, and drawing such pattern from the resultant mold.

29. The method of claim 28, including also squeezing such sand against the top of such pattern.

30. In a foundry molding machine, a support, a skeleton flask on said support, an enclosing frame encircling said flask adapted to contain molding sand therein, squeeze means operative to compact sand within said frame to form a mold in interengagement with said skeleton flask, and means for withdrawing said flask and mold as a unit from said frame.

31. A skeleton foundry molding flask comprising a horizontal flat rectangular base flange, a plurality of arched frame members having their ends mounted on said flange at opposite sides of such rectangle and together forming a grid where they cross one another, said frame members being of narrow cross-section in the lengthwise direction of the arch and tapered edgewise to afford small resistance to inward flow of sand therepast, said frame members having series of aligned apertures therethrough, and rods removably inserted in certain of said series of apertures parallel to said base flange.

32. The flask of claim 31, in which said frame members are thus tapered both outwardly and inwardly, and certain of said apertures are left unobstructed for interengagement with compacted molding sand.

33. In a mold blowing machine operative to blow molding sand against a pattern within a box and having a portion of said machine closing the upper side of said box, means operative to elevate said box and pattern to squeeze such sand against said portion of said machine, and a seal between the upper portion of said box and said portion of said machine adapted to vent air under pressure therethrough but restrain passage of sand, wherein said seal comprises brush means.

34. In a foundry molding machine, vertical squeeze means operative to compact molding sand against the top of a pattern and horizontal squeeze means operative to compact molding sand against a side of such pattern, and a skeleton flask enclosing such pattern, said horizontal squeeze means being located laterally outside said flask.

35. In a mold blowing machine operative to blow molding sand against a pattern within a box, a squeeze head having an opening therethrough, a squeeze table mounted for reciprocation toward and away from said squeeze head, a pattern enclosing shell supported on said table and having upper marginal dimensions slightly greater than the corresponding dimensions of said squeeze head to permit reciprocation of said upper margin of said shell past said squeeze head, means operative to blow sand through said opening into said shell, and means operative to reciprocate said table and shell relative to said squeeze head further to compress such sand against such pattern, and a lateral sliding seal provided between said squeeze head and said shell, said seal being of bristle material to vent air during such blowing operation while preventing escape of sand.

36. In a mold blowing machine operative to blow molding sand against a pattern within a box, a squeeze head having an opening therethrough, a squeeze table mounted for reciprocation toward and away from said squeeze head, a pattern enclosure supported on said table, means operative to blow sand through said opening against such pattern within said enclosure, such opening being provided with a deflector portion effective laterally to direct such sand blown through such opening, and means operative to reciprocate said table to squeeze such sand within said enclosure against said squeeze head and deflector, said deflector thus being disposed to protect such blow opening and any sand therein from such squeeze pressure.

37. In a foundry molding machine having a vertically reciprocable squeeze table adapted to support a flask and pattern thereon, and a squeeze head adapted to engage and squeeze sand within such flask when said table is elevated; a generally centrally disposed vertically extending blow opening in said head terminating in a sand spreader underlying such opening adapted laterally to distribute sand discharged from such blow opening into such flask against such pattern; and a fluid backed flexible diaphragm mounted on the underside of said squeeze head laterally of such blow hole, said diaphragm and spreader being adapted jointly to engage and compact the sand within such flask when said table is further elevated, said deflector thus protecting such blow opening and any sand therein from such compacting pressure.

38. In a mold blowing machine operative to blow molding sand against a pattern within a box, a squeeze head having an opening therethrough, a squeeze table mounted for reciprocation toward and away from said squeeze head, a pattern enclosure supported on said table and having upper marginal dimensions slightly greater than the corresponding dimensions of said squeeze head to enable reciprocation of said upper margin of said enclosure vertically past said squeeze head, means operative to blow sand through such opening into said enclosure, and means operative to reciprocate said table and enclosure relative to said squeeze head further to compress such sand against such pattern, a lateral sliding porous seal being provided between said squeeze head and said enclosure to vent air during such blowing operation while effectively preventing escape of sand from said enclosure.

39. In a foundry molding machine having a squeeze head and flask supporting table mounted for relative vertical reciprocation, power means for effecting such reciprocation, a pattern on said table, and a box carried by said table and encompassing said pattern; a fluid backed flexible diaphragm mounted on the underside of said squeeze head and secured to a relatively rigid downwardly projecting peripheral margin portion of the latter, said peripheral margin portion of said squeeze head being dimensioned to fit within said box for relative vertical reciprocation to squeeze sand within said box against said pattern, whereby the laterally outer portion of such sand in said box may be squeezed directly against said rigid downwardly projecting peripheral margin portion of said squeeze head and the mounting of said diaphragm may be moved progressively nearer said pattern as the squeezing operation proceeds.

40. The machine of claim 39, wherein said box is provided with an upward extension in the form of a similarly dimensioned fill frame adapted thus to receive said squeeze head.

41. The machine of claim 39, wherein said squeeze head is provided with a blow opening for blowing sand therethrough into said box against said pattern prior to such squeezing operation.

42. In a foundry molding machine, a downwardly opening box adapted to enclose a pattern covered by molding sand; a flexible diaphragm secured at its edges within said box and extending circumferentially of the sand within said box, and means for applying fluid pressure behind said diaphragm to force the latter inwardly to squeeze the sand against said pattern; the same diaphragm also extending a substantial distance over the upper part of the sand so that the sand may simultaneously be squeezed downwardly against said pattern thereby.

43. In a foundry molding machine, a downwardly opening box adapted to contain a pattern covered with molding sand; a flexible diaphragm secured at its upper and lower edges within said box and extending circumferentially of said box around such pattern and sand, said diaphragm being adapted to be forced inwardly to squeeze such sand completely circumferentially against such pattern upon introduction of fluid pressure therebehind, and said diaphragm being disposed also to overlie a portion of the upper surface of such pattern and sand.

References Cited in the file of this patent

UNITED STATES PATENTS

| | | |
|---|---|---|
| 302,349 | Moore | July 22, 1884 |
| 318,784 | Moore | May 26, 1885 |
| 331,208 | Moore | Nov. 24, 1885 |
| 505,155 | Bradbury | Sept. 19, 1893 |
| 752,797 | Norcross | Feb. 23, 1894 |
| 993,953 | Buch | May 30, 1911 |
| 1,544,216 | Campbell | June 30, 1925 |
| 2,127,204 | Daniel | Aug. 16, 1938 |
| 2,698,976 | Taccone | Jan. 11, 1955 |
| 2,757,424 | Daniel et al. | Aug. 7, 1956 |
| 2,791,013 | Demmler | May 7, 1957 |
| 2,839,799 | Herbruggen | June 24, 1958 |
| 2,864,136 | Taccone | Dec. 16, 1958 |

FOREIGN PATENTS

| | | |
|---|---|---|
| 2,467 | Great Britain | July 8, 1875 |